US010811822B2

(12) United States Patent
Kitahara et al.

(10) Patent No.: US 10,811,822 B2
(45) Date of Patent: Oct. 20, 2020

(54) SERVICE PLUG

(71) Applicants: AUTONETWORKS TECHNOLOGIES, LTD., Yokkaichi-shi, Mie (JP); SUMITOMO WIRING SYSTEMS, LIMITED, Yokkaichi-shi, Mie (JP); SUMITOMO ELECTRIC INDUSTRIES, LTD., Osaka-shi, Osaka (JP)

(72) Inventors: Yuta Kitahara, Mie (JP); Hirotaka Baba, Mie (JP)

(73) Assignees: AUTONETWORKS TECHNOLOGIES, LTD., Mie (JP); SUMITOMO WIRING SYSTEMS, LIMITED, Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/492,010

(22) PCT Filed: Feb. 27, 2018

(86) PCT No.: PCT/JP2018/007273
§ 371 (c)(1),
(2) Date: Sep. 6, 2019

(87) PCT Pub. No.: WO2018/168445
PCT Pub. Date: Sep. 20, 2018

(65) Prior Publication Data
US 2020/0076129 A1    Mar. 5, 2020

(30) Foreign Application Priority Data

Mar. 17, 2017   (JP) ................................ 2017-053210

(51) Int. Cl.
*H01R 13/62*    (2006.01)
*H01R 13/637*   (2006.01)
(Continued)

(52) U.S. Cl.
CPC .............. *H01R 13/637* (2013.01); *B60L 3/04* (2013.01); *B60R 16/033* (2013.01);
(Continued)

(58) Field of Classification Search
CPC .. H01R 13/637; H01R 13/7132; H01R 31/08; H01R 13/6271; H01R 2201/26;
(Continued)

(56) References Cited

U.S. PATENT DOCUMENTS 5,621,197 A    4/1997  Bender et al.
6,252,477 B1   6/2001  Endo et al.
(Continued)

FOREIGN PATENT DOCUMENTS

JP    2001-229797 A    8/2001
JP    2007-066855 A    3/2007
(Continued)

OTHER PUBLICATIONS

May 1, 2018 International Search Report issued in International Patent Application No. PCT/JP2018/007273.

*Primary Examiner* — Abdullah A Riyami
*Assistant Examiner* — Nelson R. Burgos-Guntin
(74) *Attorney, Agent, or Firm* — Oliff PLC

(57) ABSTRACT

A service plug includes a body portion including a pair of power bus bars that are connected to a power supply circuit by being connected to a first terminal of a connector, a switching lever portion including an interlock terminal that brings the power supply circuit into a closed state when being in a state of conduction with a second terminal of the connector, and brings the power supply circuit into an open
(Continued)

state when being in a state of non-conduction with the second terminal of the connector, and a power interruption portion that brings the interlock terminal 32 of the switching lever portion into a state of non-conduction with the second terminal to bring the power supply circuit into an open state by using an actuator that is operated in accordance with a collision detection signal for a vehicle.

4 Claims, 4 Drawing Sheets

(51) Int. Cl.
    *B60L 3/04*         (2006.01)
    *B60R 16/033*     (2006.01)
    *H01R 13/713*     (2006.01)
    *H01R 31/08*      (2006.01)
    *H01R 13/627*     (2006.01)

(52) U.S. Cl.
    CPC ......... *H01R 13/7132* (2013.01); *H01R 31/08* (2013.01); *H01R 13/6271* (2013.01); *H01R 2201/26* (2013.01)

(58) Field of Classification Search
    CPC ....... H01R 13/639; B60L 3/04; B60R 16/033; H01H 27/00; H01H 31/24; H01H 39/00
    USPC .......................... 439/34, 507, 509–512, 514
    See application file for complete search history.

(56) References Cited

U.S. PATENT DOCUMENTS

| | | | |
|---|---|---|---|
| 2001/0015883 A1 | 8/2001 | Nakamura et al. | |
| 2009/0111015 A1* | 4/2009 | Wood | H01M 2/1077 429/164 |
| 2014/0211345 A1* | 7/2014 | Thompson | H02H 1/0061 361/42 |
| 2015/0042160 A1* | 2/2015 | Matsuda | B60L 53/305 307/10.3 |
| 2015/0207130 A1* | 7/2015 | Maguire | H01M 2/1083 429/97 |
| 2020/0076129 A1* | 3/2020 | Kitahara | H01R 31/08 |
| 2020/0094702 A1* | 3/2020 | Ohtomo | B60L 53/16 |

FOREIGN PATENT DOCUMENTS

| | | |
|---|---|---|
| JP | 2008-198358 A | 8/2008 |
| JP | 2013-016427 A | 1/2013 |
| JP | 2013-143180 A | 7/2013 |

* cited by examiner

SERVICE PLUG

BACKGROUND

Conventionally, service plugs are known as power supply circuit interruption devices for interrupting power supply circuits between batteries and loads of vehicles such as hybrid cars or electric cars (see e.g., JP 2013-143180A).

In order to ensure the safety of operations such as vehicle maintenance or repair, such service plugs are configured to interrupt the power supply circuits between the batteries and the loads by the service plugs being detached from the power supply circuits during the operations.

Such service plugs are configured such that levers that can be operated by people are provided with interlock terminals, and the interlock terminals are connected to terminals of connector portions (the receiving-side housing in Patent Document 1) to bring the power supply circuits into a closed state, and the interlock terminals and the terminals of the connector portions are moved away from each other to bring the power supply circuits into an open state, thus interrupting the supply of power from the batteries.

SUMMARY

Meanwhile, a service plug as described above is configured to allow, for example, when a vehicle collision occurs, a rescuer to operate the switching lever portion to cancel the electrical connection between the interlocking terminal and the terminal of the connector portion (connector), thus interrupting the supply of power from the battery. However, there is the possibility that a problem such as electric leakage may occur, for example, if a high-voltage circuit from a high-voltage battery is damaged and short-circuited when a vehicle collision occurs, and, therefore, it is dangerous to manually operate the service plug. Accordingly, it is desirable to achieve improved safety.

The present disclosure and embodiments have been made in order to solve the above-described problem, and it is an object of some preferred embodiments to provide a service plug that can achieve improved safety.

A service plug that solves the above-described problems is a service plug that can be attached to and detached from a connector portion (connector) disposed on a power supply circuit between a battery and a load of a vehicle, including: a body portion including a pair of power bus bars that are to be connected to the power supply circuit by being connected to a first terminal of the connector portion; and a switching lever portion including an interlock terminal that brings the power supply circuit into a closed state when being in a state of conduction with a second terminal of the connector portion, and brings the power supply circuit into an open state when being in a state of non-conduction with the second terminal of the connector portion; and a power interruption portion that brings at least the interlock terminal of the switching lever portion into a state of non-conduction with the second terminal to bring the power supply circuit into the open state by using an actuator that is operated in accordance with a collision detection signal for the vehicle.

With this configuration, by bringing the interlock terminal of the switching lever portion into a state of non-conduction with the second terminal by using the actuator that is operated in accordance with the collision detection signal for the vehicle, it is possible to bring the power supply circuit into the open state, thus interrupting the supply of power from the battery. Since the supply of power from the battery can be interrupted through the operation of the actuator in this manner when a vehicle collision occurs, it is possible to achieve improved safety.

In the above-described service plug, it is preferable that the switching lever portion switches, through a pivoting operation relative to the body portion, between a holding state in which the body portion is held in a state in which the body portion and the connector portion are fixed to each other, and a releasing state in which the holding state is released to allow the body portion to be detached, and the power interruption portion brings the interlock terminal of the switching lever portion into a state of non-conduction with the second terminal to bring the power supply circuit into the open state by establishing the releasing state by using the actuator.

With this configuration, the power supply circuit is brought into the open state by the interlock terminal and the second terminal being brought into a state of non-conduction by bringing the switching lever portion into the releasing state by using the actuator, it is thus possible to easily detach the service plug from the connector portion when a vehicle collision occurs.

In the above-described service plug, it is preferable that the power interruption portion is provided between the body portion and the connector portion, and brings the interlock terminal of the switching lever portion into a state of non-conduction with the second terminal, and the power bus bars into a state of non-conduction with the first terminal to bring the power supply circuit into an open state by using the actuator.

With this configuration, it is possible to bring the interlock terminal and the second terminal into a state of non-conduction, and bring the power bus bars and the first terminal into a state of non-conduction, and it is thus possible to reliably bring the power supply circuit into the open state, thus interrupting the supply of power from the battery.

In the above-described service plug, it is preferable that the actuator of the power interruption portion is an explosive actuator that is activated in accordance with the collision detection signal.

With this configuration, using the explosive actuator makes it possible to quickly interrupt the supply of power from the battery when a vehicle collision occurs.

With the service plug according to aspects of certain preferred embodiments, it is possible to achieve improved safety.

DRAWINGS

DETAILED DESCRIPTION

First Embodiment

Figure 1:
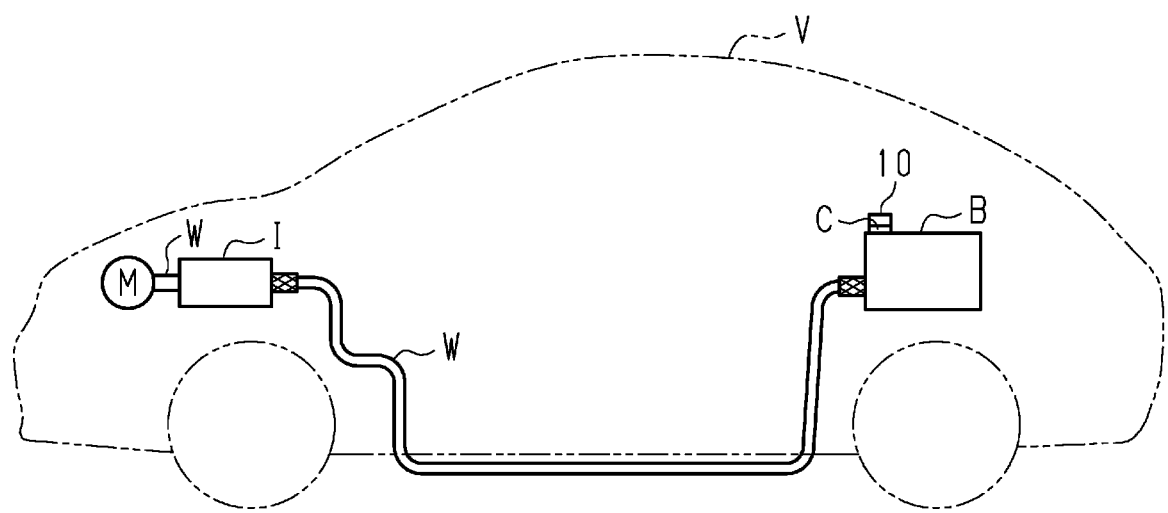
FIG. 1 is a diagram showing a schematic configuration of a vehicle according to an embodiment.

In the following, a service plug according to a first embodiment will be described with reference to the drawings. For the sake of convenience, part of the configuration may be exaggerated or simplified in the drawings. In addition, the dimensional ratios of the components may be different from the actual ratios.

The vehicle V shown in FIG. 1 includes a battery unit B, an inverter unit I, and a motor unit M that are electrically connected via a wire harness W. In the present example, the inverter unit I and the motor unit M are provided at the front of the vehicle V, and the inverter unit I and the motor unit M are connected to each other via the wire harness W. In addition, the battery unit B is provided at the rear of the vehicle V, and the inverter unit I and the battery unit B are connected to each other via the wire harness W.

For the battery unit B, a connector portion C is provided on a power supply circuit between the battery unit B and the motor unit M serving as a load. A service plug 10 is detachably provided to the connector portion C. The connector portion C of the present example includes a pair of first terminals C1 constituting a power supply circuit, and a pair of second terminals C2 constituting an interlock circuit that switches the power supply circuit between on and off.

Figure 2:
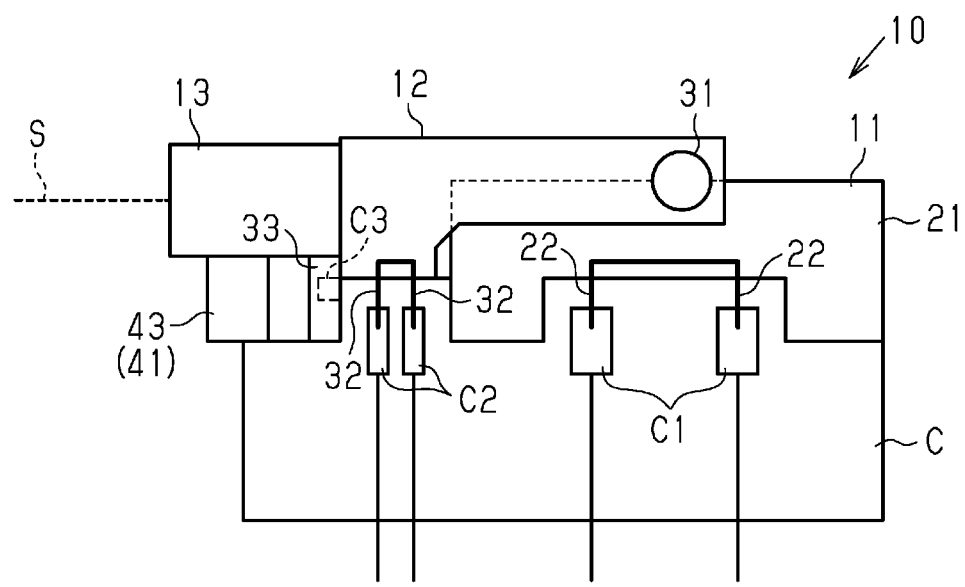
FIG. 2 is a diagram showing a schematic configuration of a service plug according to the embodiment.

As shown in FIG. 2, the service plug 10 includes a body portion 11 that is to be attached to the connector portion C, and a switching lever portion 12 that switches the state of fixation between the body portion 11 and the connector portion C between a locked state and an unlocked state.

The body portion 11 includes a housing 21 and a pair of power bus bars 22 that are provided inside the housing 21. The pair of power bus bars 22 are electrically connected to the first terminals C1 provided on the connector portion C side, and, thus, a power supply circuit is formed between the battery unit B and the motor unit M.

The switching lever portion 12 is attached, at its proximal end portion, to the body portion 11 using a pivot pin 31, and is pivotable about the pivot pin 31. The switching lever portion 12 includes, on its distal end portion side, interlock terminals 32 that can be connected to the second terminals C2 of the connector portion C. Here, the interlock circuit includes a relay circuit that is interposed in the power supply circuit. The power supply circuit is in an open state (off) in a state (state of non-conduction) in which the interlock terminals 32 are not conductively connected to the second terminals C2, and the power supply circuit is in a closed state (on) in a state (state of conduction) in which the interlock terminals 32 are conductively connected to the second terminals C2.

In addition, the switching lever portion 12 includes, at its distal end portion, an engaging claw portion 33 that engages with an engaging protrusion C3 of the connector portion C. The engaging claw portion 33 and the engaging protrusion C3 constitute a so-called snap-fit structure, and are configured to restrict the pivoting of the switching lever portion 12 by engaging with each other, thus holding the body portion 11 in a fixed state. That is, the switching lever portion 12 is configured to enable switching between a holding state in which the body portion 11 is held in a state in which the body portion 11 and the connector portion C are fixed to each other, and a releasing state in which the holding state is released to allow the body portion 11 to be detached.

In the service plug 10 according to the present embodiment, a power interruption portion 13 is provided at the distal end portion of the switching lever portion 12.

Figure 3:
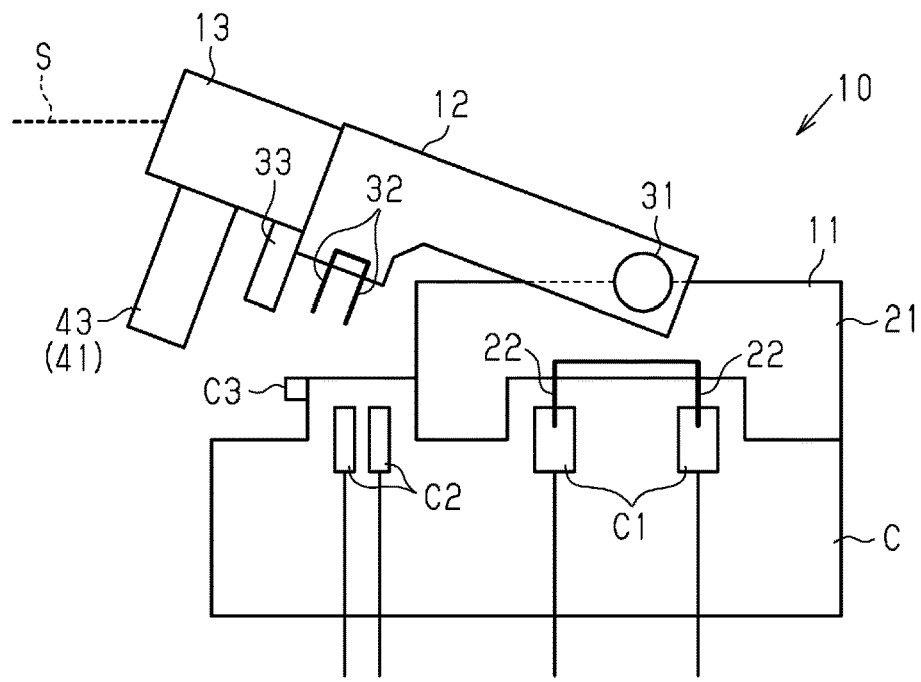
FIG. 3 is a diagram showing a schematic configuration of the service plug according to the embodiment.

As shown in FIGS. 2 to 4(*a*) and (*b*), the power interruption portion 13 includes an explosive actuator 41. The actuator 41 includes a substantially cylindrical cylinder portion 42, a piston portion 43 disposed in a cylinder bore inside the cylinder portion 42, and a gas generation portion 44 that generates combustion gas by igniting and burning an explosive in accordance with a collision detection signal from an impact detection sensor.

The cylinder portion 42 has a through hole 42*b* formed in one bottom portion 42*a* of the cylinder bore, and includes the gas generation portion 44 at the other bottom portion 42*c*.

The piston portion 43 includes a columnar portion 43*a*, and a disk portion 43*b* that is provided at an end portion of the columnar portion 43*a*. In the piston portion 43, the disk portion 43*b* is accommodated in the cylinder bore of the cylinder portion 42, with the columnar portion 43*a* being inserted into the through hole 42*b* of the cylinder portion 42. The diameter of the columnar portion 43*a* is substantially the same as, or slightly smaller than, the inner diameter of the through hole 42*b*. The diameter of the disk portion 43*b* is substantially the same as the inner diameter of the cylinder portion 42, is larger than the diameter of the columnar portion 43*a*, and is larger than the inner diameter of the through hole 42*b*. Accordingly, for example, even when the disk portion 43*b* is in close proximity to one bottom portion 42*a* of the cylinder portion 42, the disk portion 43*b* having a larger diameter than that of the through hole 42*b* abuts against the bottom portion 42*a*, and, therefore, the piston portion 43 is inhibited from falling off from the cylinder bore of the cylinder portion 42.

The gas generation portion 44 is attached to the other bottom portion 42*c* so as to be provided between the bottom portion 42*c* of the cylinder bore of the cylinder portion 42 and the piston portion 43. The gas generation portion 44 is configured to be ignited and burnt by an initiator (ignition device), which is not shown, in accordance with a collision detection signal S that notifies detection of a collision of the vehicle V and that is output from a collision detection sensor (satellite sensor), which is not shown. Note that the collision detection sensor as used herein includes a determination circuit that determines the occurrence of a collision, based on acceleration (deceleration) information from an acceleration sensor, and the collision detection signal S from the collision detection sensor is output to the service plug 10 side if the determination circuit has determined that a collision has occurred.

Then, when an explosive has been ignited and burnt in the gas generation portion 44, the resulting combustion gas causes the piston portion 43 to be pressed, thus moving the piston portion 43 toward the bottom portion 42*a* having the through hole 42*b* in the cylinder bore of the cylinder portion 42. Accordingly, the distal end portion of the piston portion 43 (the columnar portion 43*a*) is further exposed to the outside, and abuts against the connector portion C. The repulsive force resulting from the abutment causes the switching lever portion 12 to be operated in a direction away from the connector portion C, thus releasing the mechanical contact between the interlock terminals 32 and the second terminals C2, and bringing about the state of non-conduction. Consequently, the above-described relay circuit is turned off to open the power supply circuit, thus bringing about the state of non-conduction.

Next, the operations of the present embodiment will be described.

By the service plug 10 of the present embodiment being connected to the connector portion C, the power bus bars 22 are connected to the corresponding first terminals C1 of the connector portion C, thus forming the power supply circuit that connects the battery unit B to the motor unit M via the inverter unit I. Furthermore, the interlock circuit capable of switching the power supply circuit between on and off by turning the relay circuit on or off is provided in the power supply circuit. By the second terminals C2 of the connector portion C and the corresponding interlock terminals 32 of the service plug 10 being connected to each other, the relay circuit is turned on, thus turning the power supply circuit on. By the second terminal C2 and the interlock terminal 32 of the service plug 10 being disconnected from each other, the relay circuit is turned off, thus bringing the power supply circuit into the open state. Accordingly, it is possible to interrupt the supply of power from the battery unit B.

The service plug 10 of the present embodiment is provided with the power interruption portion 13 that includes the actuator 41, and the actuator 41 is configured to be operated in accordance with the collision detection signal S.

Figure 4A:
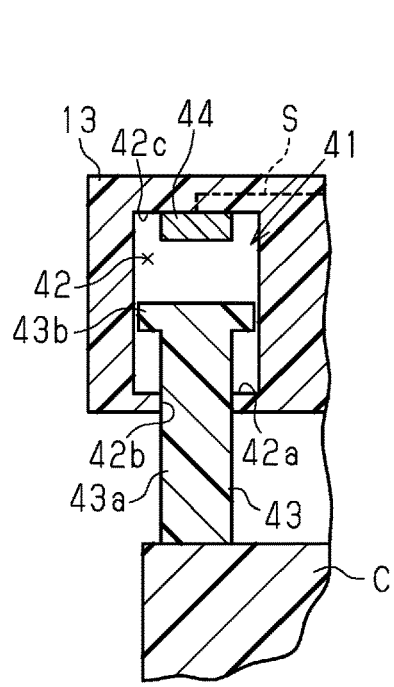
FIGS. 4A and 4B are cross-sectional views for illustrating the operation of a power interruption portion of the service plug.

As shown in FIG. 4A, before activation of the actuator 41, the distal end portion of the columnar portion 43a of the piston portion 43 abuts against the connector portion C. At this time, the interlock terminals 32 and the corresponding second terminals C2 are electrically connected to each other as shown in FIG. 2.

Figure 4B:
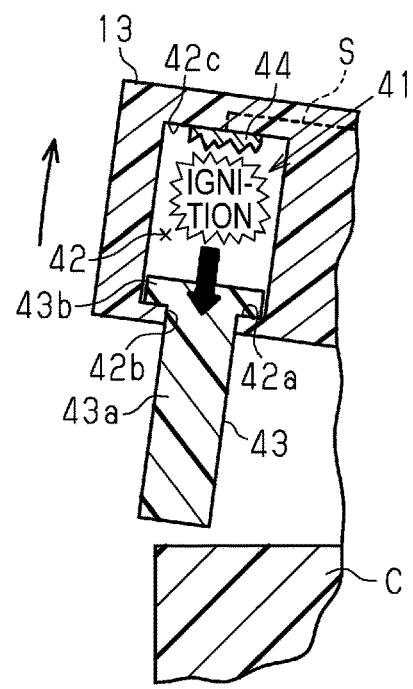

As shown in FIG. 4B, upon activation of the actuator 41, the disk portion 43b of the piston portion 43 is pressed toward the bottom portion 42a, and is moved in close proximity to the bottom portion 42a. Accordingly, the columnar portion 43a of the piston portion 43 is operated to be further exposed to the outside, and, as a result, repulsive force is generated between the piston portion 43 and the connector portion C. This repulsive force releases the engaging state between the engaging claw portion 33 of the switching lever portion 12 and the engaging protrusion C3 of the connector portion C, and the switching lever portion 12 is pivoted so as to move away from the connector portion C as shown in FIG. 3, thus moving the interlock terminals 32 and the corresponding second terminals C2 away from each other, and bringing the interlock terminals 32 and the second terminals C2 into the state of non-conduction. Consequently, the power supply circuit is brought into the open state, thus interrupting the supply of power from the battery unit B.

Next, the effects of the present embodiment will be described.

(1) By bringing the interlock terminals 32 of the switching lever portion 12 into a state of non-conduction with the second terminals C2 by using the actuator 41 that is operated in accordance with the collision detection signal S for the vehicle V, it is possible to bring the power supply circuit into the open state, thus interrupting the supply of power from the battery unit B. Since the supply of power from the battery unit B can be interrupted through the operation of the actuator 41 in this manner when a vehicle collision occurs, it is possible to achieve improved safety.

(2) The power supply circuit is brought into the open state by the interlock terminals 32 and the second terminals C2 being brought into the state of non-conduction by bringing the switching lever portion 12 into the releasing state by using the actuator 41, and it is thus possible to easily detach the service plug 10 from the connector portion C when a vehicle collision occurs.

(3) Using the explosive actuator 41 makes it possible to quickly interrupt the supply of power from the battery unit B when a vehicle collision occurs.

(4) It is envisaged that, by an impact caused when a vehicle collision occurs, the cores of a plus-side high-voltage wire and a minus-side high-voltage wire included in the wire harness W come into direct contact with each other, or the cores of the wires may be connected via some conductor such as a fractured piece of a shield pipe through which the wires are passed, or the other vehicle components. However, since the supply of power from the battery unit B is interrupted by the service plug 10 of the present embodiment, it is possible to inhibit a short circuit between the cores of the wires.

Second Embodiment

In the following, a service plug according to a second embodiment will be described with reference to the drawings. For the sake of convenience, part of the configuration may be exaggerated or simplified in the drawings. In addition, the dimensional ratios of the components may be different from the actual ratios. In the present embodiment, the same components as those of the first embodiment described above are denoted by the same reference numerals, and the illustrations thereof have been omitted partially or entirely.

Figure 5:
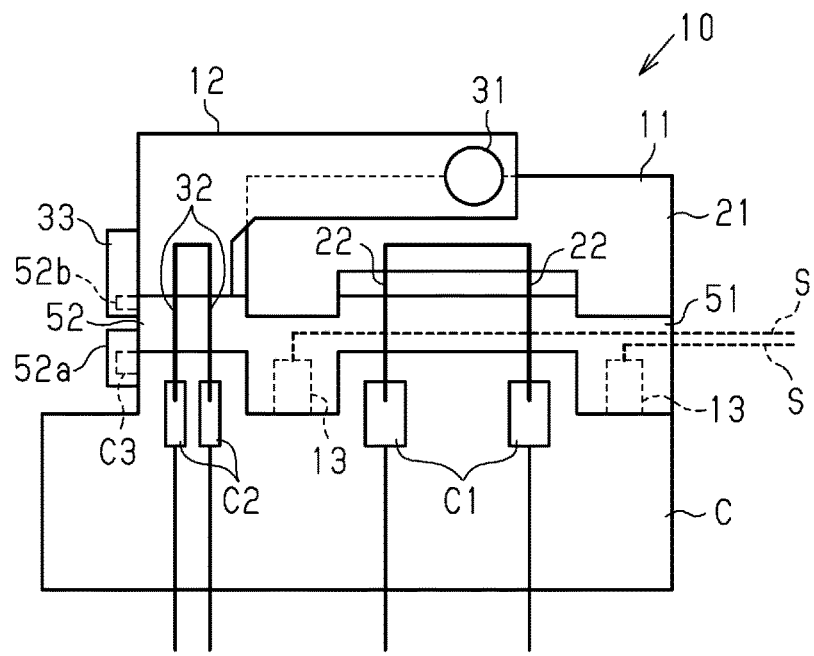
FIG. 5 is a diagram showing a schematic configuration of a service plug according to a second embodiment.

As shown in FIG. 5, a service plug 10 according to the present embodiment includes an intermediate unit 51 including a power interruption portion 13 between the body portion 11 and the connector portion C.

In the intermediate unit 51, a plurality of power interruption portions 13 are provided inside a housing 52. In the present example, the structure for attaching the body portion 11 to the intermediate unit 51 and the structure for attaching the intermediate unit 51 to the connector portion C are substantially the same, and, therefore, the body portion 11 can be directly attached to the connector portion C, for example, when the intermediate unit 51 is omitted. The housing 52 of the intermediate unit 51 includes, at its end portion, an engaging claw portion 52a that engages with the engaging protrusion C3 of the connector portion C, and an engaging protrusion 52b with which the engaging claw portion 33 of the switching lever portion 12 engages in the pivoting direction.

Next, a detachment step of the service plug 10 of the present embodiment at the time of maintenance will be described.

Figure 6:
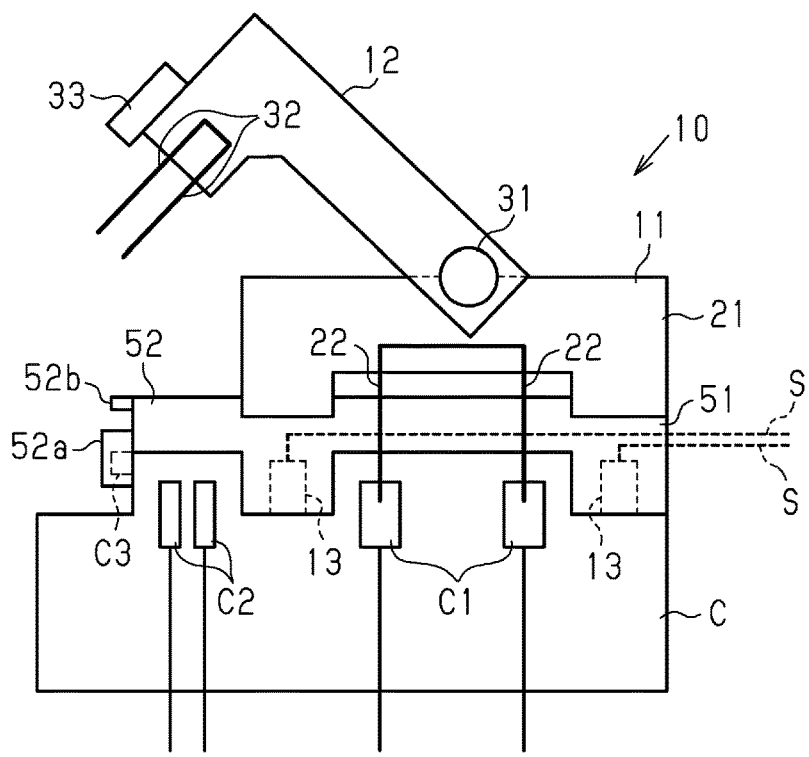
FIG. 6 is a diagram showing a schematic configuration of the service plug according to the embodiment.

As shown in FIG. 6, the switching lever portion 12 is operated so as to be pivoted, thus releasing the engaging state between the engaging claw portion 33 of the switching lever portion 12 and the engaging protrusion 52b of the intermediate unit 51. This brings the interlock terminals 32 and the second terminals C2 of the connector portion C into the state of non-conduction, thus interrupting the supply of power from the battery unit B.

Figure 7:
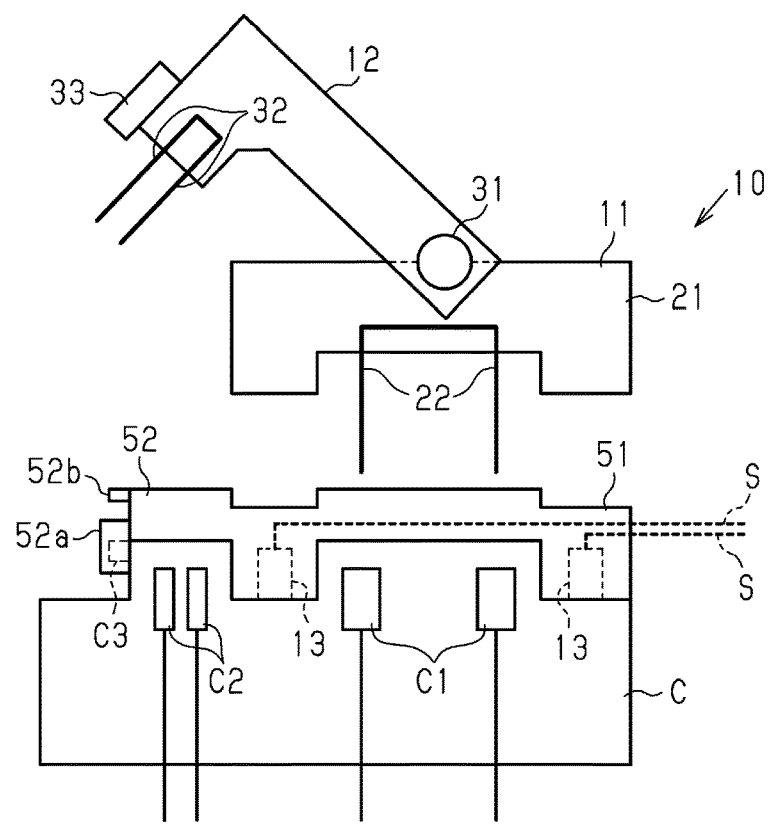
FIG. 7 is a diagram showing a schematic configuration of the service plug according to the embodiment.

As shown in FIG. 7, the body portion 11 is pulled out from the intermediate unit 51 by gripping the switching lever portion 12. This brings the power bus bars 22 of the body portion 11 and the first terminals C1 of the connector portion C into the state of non-conduction, thus opening the power supply circuit to reliably interrupt the supply of power from the battery unit B.

The body portion 11 and the intermediate unit 51 are separated from each other when an operator detaches the service plug 10 for maintenance or the like as described above.

Next, the interruption of the supply of power in the service plug 10 of the present embodiment when a vehicle collision occurs will be described.

Figure 8:
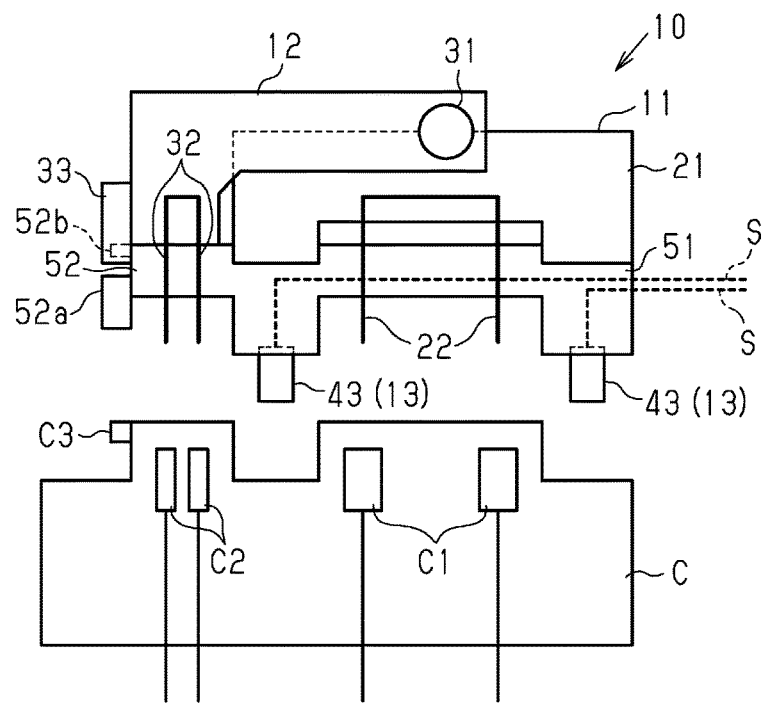
FIG. 8 is a diagram showing a schematic configuration of the service plug according to the embodiment.

As shown in FIG. 8, in accordance with the collision detection signals S that are input to the service plug 10, the piston portions 43 are operated to protrude from the intermediate unit 51 toward the connector portion C by using the actuators 41 of the power interruption portions 13, and, thereby, the intermediate unit 51 is separated from the connector portion C. This brings the interlock terminals 32 and the second terminals C2 into the state of non-conduction, and brings the power bus bars 22 and the first terminals C1 into the state of non-conduction.

According to the present embodiment, in addition to the effects (1), (3), and (4) of the above embodiment, the following effects are achieved.

(5) It is possible to bring the interlock terminals 32 and the second terminals C2 into the state of non-conduction, and bring the power bus bars 22 and the first terminals C1 into the state of non-conduction, and it is therefore possible to reliably bring the power supply circuit into the open state, thus interrupting the supply of power from the battery unit B.

Note that each of the above-described embodiments may be modified as follows.

Although each of the above-described embodiments adopts a configuration in which the explosive actuator 41 is used as the power interruption portion 13, the present disclosure is not limited thereto. For example, it is possible to adopt a mechanism for operating the piston portion by using a push solenoid.

Although each of the above-described embodiments adopts a configuration in which the switching lever portion 12 is configured to be pivotable about the pivot pin 31 relative to the body portion 11, and the electrical connection between the second terminals C2 of the connector portion C and the interlock terminals 32 is switched between the state of conduction and the state of non-conduction by causing the switching lever portion 12 to pivot, the present disclosure is not limited thereto. For example, it is possible to adopt a configuration in which the electrical connection between the second terminals C2 of the connector portion C and the interlock terminals 32 is switched between the state of conduction and the state of non-conduction by sliding the switching lever portion 12. In such a configuration, it is possible to additionally provide a configuration in which the sliding direction of the switching lever portion 12 is a direction orthogonal to the direction in which the body portion 11 is pulled out from the connector portion C, and, after sliding the switching lever portion 12 relative to the body portion 11, the body portion 11 can be pulled out from the connector portion C. An example of such a configuration is the service plug disclosed in JP 2012-79644A.

Although each of the above-described embodiments adopts a configuration in which the power interruption using the power interruption portion 13 is performed in accordance with the collision detection signal S from the collision detection sensor, the present disclosure is not limited thereto. For example, it is possible to adopt a configuration in which a current that is input to the initiator (ignition device) of an inflator during the opening operation of an air bag that is mounted in the vehicle V is used as the collision detection signal.

The actuator 41 may be referred to as a "pop-up mechanism" for causing at least a portion of the service plug 10 to non-manually, i.e., automatically, pop up from the connector portion C in response to the collision detection signal S, and cancelling the electrical connection between the service plug 10 and the connector portion C.

In each of the embodiments, the service plug 10 (e.g., the actuator 41) is configured to receive the collision detection signal S from the collision detection sensor. For example, the service plug 10 may include a signal line for connecting the collision detection sensor and the actuator 41 (e.g., the gas generation portion 44) to each other. The collision detection signal S is supplied to the actuator 41 by using the signal line. In some non-limiting examples, the switching lever portion 12 may include the signal line as shown in FIG. 3. In some other non-limiting examples, the intermediate unit 51 may include the signal line as shown in FIG. 6.

The pair of first terminals C1 of the connector portion C may be referred to as a pair of fixed contacts of the power supply circuit, or a first pair of fixed contacts. The pair of second terminals C2 of the connector portion C may be referred to as a pair of fixed contacts of the interlock circuit, or a second pair of fixed contacts. Each power bus bar 22 of the service plug 10 may be referred to as a movable contact of the power supply circuit. Each interlock terminal 32 of the service plug 10 may be referred to as a movable contact of the interlock circuit.

The switching lever portion 12 is configured such that an operator can pivot the lever portion 12 relative to the body portion 11 using his or her fingers or hand, and can pull the lever portion 12 and the body portion 11 upward while holding the lever portion 12 with his or her fingers or hand. The switching lever portion 12 may be referred to as a lever knob or a lever handle.

The embodiments and the modifications described above may be combined as appropriate.

The present disclosure encompasses the following implementation examples. Reference numerals are assigned to the constituent elements of the embodiments, not for limiting purpose, but for better understanding.

[Appendix 1] Some implementation examples provide a service plug (10) that can be attached to and detached from a connector portion (C) disposed on a power supply circuit between a battery (B) and a load (M) of a vehicle (V), wherein the service plug (10) is configured such that the power supply circuit is closed via the service plug (10) when the service plug (10) is attached to the connector portion (C), and the power supply circuit is opened when the service plug (10) is detached from the connector portion (C). The service plug (10) includes an actuator (41) configured to receive a collision detection signal (5) indicating a collision event of the vehicle (V), and the actuator (41) includes a pop-up mechanism (42, 43, 44) for causing, in response to the collision detection signal (5), at least a portion of the service plug (10) to automatically pop up from the connector portion (C) to cancel electrical connection between the service plug (10) and the connector portion (C).

[Appendix 2] Some implementation examples provide a service plug (10) that is used with a connector portion (C) including a first pair of fixed contacts (C1) included in a power supply circuit of a vehicle (V), and a second pair of fixed contacts (C2) included in an interlock circuit of the vehicle (V). The service plug (10) includes a body portion (11), and a lever portion (12) that is pivotably supported by the body portion (11), and the body portion (11) includes power bus bars (22) that are electrically connected to the first pair of fixed contacts (C1) provided at a first portion of the connector portion (C) when the service plug (10) is attached to the connector portion (C). The lever portion (12) includes interlock terminals (32) that are electrically connected to the second pair of fixed contacts (C2) provided at a second portion of the connector portion (C) when the service plug (10) is attached to the connector portion (C). The service plug (10) further includes an actuator (41) configured to receive a collision detection signal (5) indicating a collision event of the vehicle (V), and the actuator (41) includes a pop-up mechanism (42, 43, 44) for causing, in response to the collision detection signal (S), at least the lever portion (12) of the service plug (10) to automatically pop up from the second portion of the connector portion (C) to cancel the electrical connection between the interlock terminals (32) of the service plug (10) and the second pair of fixed contacts (C2) of the connector portion (C).

[Appendix 3] In some implementation examples, the pop-up mechanism (42, 43, 44) is configured to:

cause, in a state in which the body portion (11) of the service plug (10) is disposed at the first portion of the connector portion (C), the lever portion (12) to pivot relative to the body portion (11) to cause only the lever portion (12) of the service plug (10) to automatically pop up from the second portion of the connector portion (C).

[Appendix 4] In some implementation examples, the pop-up mechanism (42, 43, 44) is configured to cause the lever portion (12) and the body portion (11) to automatically pop up from the connector portion (C).

[Appendix 5] In some implementation examples, the pop-up mechanism (42, 43, 44) is provided in the lever portion (12).

[Appendix 6] In some implementation examples, the service plug (10) further includes an intermediate unit (51) that is sandwiched between the body portion (11) and the lever portion (12) and the first portion and the second portion of the connector portion (C), and the intermediate unit (51) is configured such that the power bus bars (22) and the interlock terminals (32) pass through the intermediate unit (51) and are electrically connected to the first pair of fixed contacts (C1) and the second pair of fixed contacts (C2) respectively, and the pop-up mechanism (42, 43, 44) is provided in the intermediate unit (51).

[Appendix 7] In some implementation examples, the service plug (10) includes a signal line for supplying the collision detection signal (S) to the actuator (41).

[Appendix 8] In some implementation examples, the pop-up mechanism (42, 43, 44) includes a gas generation portion (44), and a piston (43) that performs an extrusion stroke for causing the service plug (10) to pop up using gas pressure generated by the gas generation portion (44).

[Appendix 9] In some implementation examples, the piston (43) includes a piston head (43b) that receives gas pressure generated by the gas generation portion (44), and a leg portion (43a) that pushes the connector portion (C) when the piston (43) performs the extrusion stroke.

It will be apparent to those skilled in the art that the present invention may be embodied in other specific forms without departing from the technical concept of the invention. For example, the components described in the embodiments above (or one or more aspects thereof) may be partly omitted and/or combined. The scope of the present invention is to be defined with reference to the appended claims, along with the full range of equivalents to which the claims are entitled.

LIST OF REFERENCE NUMERALS

10 Service plug
11 Body portion
12 Switching lever portion
13 Power interruption portion
22 Power bus bar
32 Interlock terminal
41 Actuator
B Battery unit (battery)
C Connector portion (connector)
C1 First terminal
C2 Second terminal
M Motor (load)
S Collision detection signal
V Vehicle

The invention claimed is:

1. A service plug configured to be attached to and detached from a connector disposed on a power supply circuit between a battery and a load of a vehicle, the service plug comprising:

a body including a pair of power bus bars connected to the power supply circuit by connecting the pair of power bus bars to a first terminal of the connector;

a switching lever including an interlock terminal that switches the power supply circuit into (i) a closed state when the interlock terminal is in a state of conduction with a second terminal of the connector, and (ii) an open state when the interlock terminal is in a state of non-conduction with the second terminal of the connector; and a power interruption portion including an actuator, the actuator switching at least the interlock terminal of the switching lever into a state of non-conduction with the second terminal to switch the power supply circuit into the open state by using that actuator that is operated in accordance with a collision detection signal for the vehicle.

2. The service plug according to claim 1, wherein:

the switching lever switches, through a pivoting operation relative to the body, between (i) a holding state in which the body is held in a state in which the body and the connector are fixed to each other, and (ii) a releasing state in which the holding state is released to allow the body to be detached, and the power interruption portion switches the interlock terminal of the switching lever into a state of non-conduction with the second terminal to switch the power supply circuit into the open state by establishing the releasing state by using the actuator.

3. The service plug according to claim 1, wherein the power interruption portion is provided between the body and the connector, the power interruption portion switching the interlock terminal of the switching lever into a state of non-conduction with the second terminal, and switching the pair of power bus bars into a state of non-conduction with the first terminal to bring the power supply circuit into an open state by using the actuator.

4. The service plug according to claim 2, wherein the actuator of the power interruption portion is an explosive actuator that is activated in accordance with the collision detection signal.

* * * * *